United States Patent [19]
Douklias et al.

[11] 3,773,401
[45] Nov. 20, 1973

[54] COHERENT OPTICAL MULTICHANNEL CORRELATOR

[75] Inventors: Nikolaos Douklias; Gerhard Winzer; Ulrich Wolff, all of Muenchen, Germany

[73] Assignee: Siemens Aktiengesellschaft, Berlin & Munich, Germany

[22] Filed: May 10, 1972

[21] Appl. No.: 252,022

[30] Foreign Application Priority Data
May 13, 1971 Germany.................. P 21 23 833.5

[52] U.S. Cl. ......... 350/162 SF, 350/3.5, 350/162 R
[51] Int. Cl. .............................................. G02b 5/18
[58] Field of Search ...................... 350/3.5, 162 SF, 350/162 R

[56] References Cited
UNITED STATES PATENTS
| | | | |
|---|---|---|---|
| 3,512,871 | 5/1970 | Zweig............................ | 350/162 SF |
| 3,571,603 | 3/1971 | Bryant........................... | 350/162 SF |
| 3,619,033 | 11/1971 | McMahon............................ | 350/3.5 |

OTHER PUBLICATIONS
Hill, "Some Aspects of a Large Capacity Holograpic Memory" Appl. Optics, Vol. 11, No. 1, Jan. 1972, pp. 182–191.
Sincerbox, "Light Shutter," IBM Technical Disclosure Bull., Vol. 10, No. 3, Aug. 1967, pp. 269–270.

*Primary Examiner*—Ronald L. Wibert
*Attorney*—Carlton Hill et al.

[57] ABSTRACT

A coherent optical multichannel correlator for identifying an object by permeating an object with a beam of coherent light which is projected through a Fourier transformation lens onto a filter hologram which reconstructs a reference beam projected on a photo detector when the object to be identified corresponds to the filter hologram characterized by providing a plurality of filter holograms arranged on the focal plane of the lens, and a diffraction grating modulator to modulate the light beam to control the selection of the filter hologram on which the light is projected. Modulation can be either by changing the grating constant to vary the angle phi between the diffracted beam and original beam axis or by rotating the orientation of the diffracted beams through an angle theta. Preferably, the diffraction modulating varies both the angle phi and the angle theta either continuously to have the diffracted beam follow a spiral path along the filter holograms or in a step-like manner to have the diffracted beam follow a path of concentric circles along the filter holograms. The modulator can be a pair of rotatable diffraction gratings, a pair of rotatable diffraction gratings which are thin phase holograms, or a pair of diffraction gratings, one being a volume-phase hologram and the other a thin (phase) hologram. The modulator can also be a fixed grating of electro-optical material which has a grating pattern with a grating constant and orientation which are controlled by the application of an electrical or a magnetic field, or some other means that shifts the illuminating beam on an angle phi.

12 Claims, 14 Drawing Figures

COHERENT OPTICAL MULTICHANNEL CORRELATOR

BACKGROUND OF THE INVENTION

1. Field of the Invention:

The present invention is directed to a coherent optical multichannel correlator for providing a system to identify objects.

2. Prior Art:

In automatic identification of a two-dimensional object, for instance in an alpha numerical sign, a certain tolerance region for the position coordinates of the object is required in the signal input plane. When using holographic adapted filters in a system to identify signs, the object to be identified is projected through a Fourier transformation lens onto a filter hologram, and when the object to be identified and the filter hologram coincide, a reference beam is reconstructed to provide a useful signal. The holographic adapted filters provide increased tolerances for the position coordinates of a sign to be identified; however, rotational variations in the coordinates of the object can only be identified in a recognition system that has a multichannel correlator.

A coherent optical multichannel correlator with fast parallel processing of the information of all two-dimensional channels has already been suggested which, however, has the disadvantage in that in case of a large channel number, the signal/noise condition and the entire yield of light show unfavorable values. A large channel figure exists if 26 signs, for instance the alphabet, are to be recognized with each letter of the alphabet being recognized in ten different angular positions. In addition, during parallel multichannel correlation, the Fourier transform belonging to different orientations of the signs in the holographic plane are superimposed in such a way that all zero diffraction orders emerge locally. Therefore, especially in the case of low spatial frequencies, the danger of overmodulation of the characteristic curve of the holographic input material may occur.

SUMMARY OF THE INVENTION

The present invention is directed to a coherent optical multi-channel correlator utilizing a source of coherent light for the illumination of an object to be identified, a Fourier transformation lens, several filter holograms and a photo detector array, which correlator has an even intensity distribution over the entire photo plate, as well as a high signal/noise condition and produces a good light yield. In the correlator, means for modulating the light beam by diffracting it is provided. The means for modulating may change the angle of diffraction from the axis of the light beam or the diffracted light is rotated about the axis of the light beam.

In one embodiment, the modulating means is a pair of rotating gratings which selectively position the diffracted light beam on the various filter holograms. By varying the speed of rotation of the two gratings, the diffracted beam will follow the path on the filter holograms which is a spiral. If the angle of orientation between the grids is changed in a step-like manner, the beam will be projected on the filter holograms in a path corresponding to concentric circles. The pair of rotating gratings can be optical gratings having ronchi rulings, a pair of thin (phase) holograms, or a volume-phase hologram utilized in conjunction with the thin (phase) hologram.

Another embodiment utilizes a stationary grating whose grating constant and the orientation of the grating is controlled by the application of an electric or magnetic field, and by changing the intensity of the field, the grating constant and/or orientation are changed, or some other means that shifts the illuminating beam on an angle phi.

DESCRIPTION OF THE PREFERRED EMBODIMENTS

Figure 1:
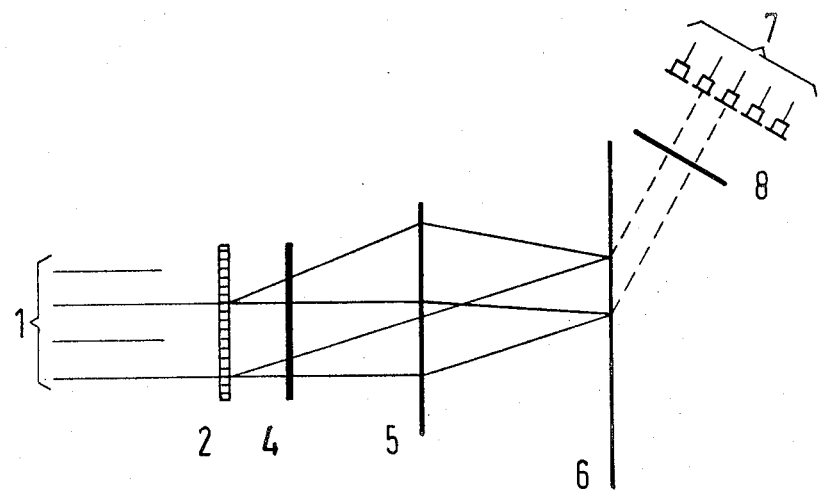
FIG. 1 is a schematic illustration of a multichannel correlator according to the present invention.

The principles of the present invention are particularly useful when incorporated in a coherent optical multichannel correlator schematically illustrated in FIG. 1 and utilizing a means to provide a beam 1 of monochromatic coherent light which passes through a means for modulating the light by diffracting which is illustrated as a diffraction grating 2. The modulated beam permeates a sign or object carrier 4 and is received by a Fourier transform lens 5 which focuses it onto a hologram carrier 6 which is arranged in a focal plane of the lens 5. The correlator includes a photo detector array 7 which may be segmented and which produces an electrical signal suited for further processing when the sign on the carrier 4 has auto-correlation with the filter hologram on the hologram carrier 6 to reconstruct a reference wave which may be focused by providing an integration lens 8 onto the detector 7.

Figure 2:
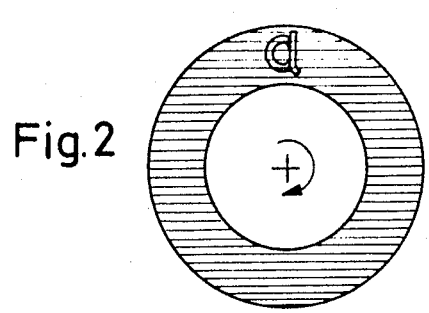
FIG. 2 is a plan view of a rotating grating according to the present invention.
Figure 3:
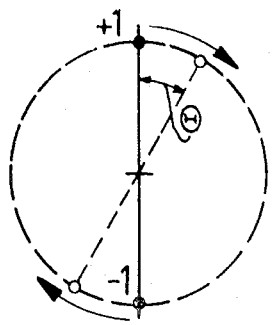
FIG. 3 illustrates a Fourier spectrum for the grating of FIG. 2.

The modulator, such as the single diffraction grating 2, as illustrated in FIGS. 2 and 3, causes diffraction of the beam of coherent light 1 to be at an angle phi to the axis of the beam 1 for a given frequency of the light beam. With the diffraction, the Fourier lens has a Fourier spectrum of the beam in the + 1 and − 1 diffraction order of an object such as the sign "a" illustrated in FIG. 2, which is being investigated by the correlator. If the grating 2 is rotated as indicated by the arrow in FIG. 2 through an angle theta ($\theta$) with respect to the orientation illustrated in FIG. 2, the Fourier spectrum is rotated through an angle theta, as illustrated in FIG. 3. The movement of the grating through an angle theta is known as theta modulation, and this technique of modulating a light beam is discussed and described in an article by J.D. Armitage and A.W. Lohmann, "Theta Modulation in Optics," Applied Optics Volume 4, No. 4, April 1965, pages 399–403.

In the diffraction grating, illustrated in FIG. 2, which may be an optical grating having ronchi rulings, there is a constant space between the grating lines to provide a constant diffraction angle for a given frequency. Thus rotation of the orientation of the grating on its axis results in the +1 and −1 diffraction orders moving in a circular path when the diffracted light beam moves on a circumference of a cone. By arranging the filter holograms in a corresponding circular path on a carrier located in the focal plane of the lens 5, the sign to be identified can be projected on a series of different filter holograms until auto-correlation occurs. When auto-correlation occurs, the pattern of light of the Fourier spectrum coincides with the object wave for the filter hologram and causes a reconstruction of the reference wave which projects onto the photo detector array 7 to provide an electrical signal which may be further processed in the system.

It has been found in the case of sequential signal processing by means of theta modulation in a coherent optical correlator that a considerable higher effectiveness can be reached than in the case of parallel signal processing. Since it is necessary to offer single filters sequentially to a recognized signal, the correlation period increases by the same factor; however, the signal impedance is considerably improved due to the intensity of the detector signal increasing in case of auto-correlation by the same factor, if the illumination intensity is sent completely into the corresponding channel. A simple, sequentially operating multichannel correlator can be designed in such a way that a level object illumination wave, which revolves on a cone, controls the necessary channel of the adapted filter in the Fourier plane.

All channels of the adapted filters are, in this case, produced with the same reference wave direction. The integration of the reconstructed reference wave of the auto-correlation signal is carried out by a collective lens, or a converging reference wave is selected during the production of the adapted filter. The detector 7, which is composed of individual detector elements, is arranged in the focal plane of the reconstructed reference wave. Each of the detector elements gives out a signal only after exceeding a threshold value of illumination. Therefore, the dissipated or scattered intensity in case of auto-correlation does not lead to the recognition signal if it is below the threshold value of illumination which is common to all the detector elements, unless the threshold value of intensity in at least one element is exceeded.

The method of theta modulation is explained by a plane wave revolving in the outer circumference of a cone. For identification of the sign by use of auto-correlation with a filter hologram, the turning angle has to be known to identify the particular filter hologram matched with the sign.

To produce the above-described sequential theta modulation, a rotating grating is the easiest form of modulating the light beam. During production of the adapted filter of the Fourier hologram of a certain sign in a certain angle, the angular position or orientation is taken by means of a single reference wave at each position. An impulse wave difference is suited for the recording of the filter hologram for a given sign and each position of angular orientation, and the subsequently produced group of filter holograms are arranged in a Fourier transformation plane on a circle. During the recognition process the grating is rotated on an axis parallel to the beam axis of the light beam 1 at a high angular speed to control the individual filter holograms on which the Fourier transform spectrum of the sign to be identified is projected.

Figure 4:
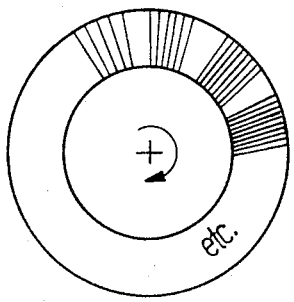
FIG. 4 is a plan view of another embodiment of a grating used as a modulator in the present invention.
Figure 5:
FIG. 5 is a Fourier spectrum for the grating of FIG. 4.

In the described single grating or diffraction grating, the angle phi remains constant due to the constant of the diffraction grating. In FIG. 4, a grating is illustrated which is provided with portions of different grating constants along the periphery of each of the groups of gratings to diffract the searched-for sign on two points on a straight line, as illustrated in FIG. 5. By changing the grating constant, the amount of diffraction for a given light frequency varies, as illustrated by the different points. As the grating of FIG. 4 rotates to present different gratings having different grating constants, the Fourier spectrum of the first and second order of diffractions are shifted along the line illustrated in FIG. 5, depending on the grating constant of the diffraction grating.

Figure 6:
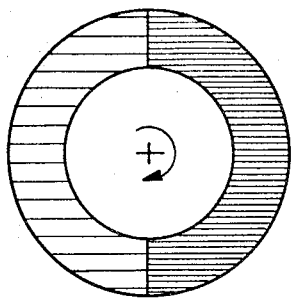
FIG. 6 is an embodiment of a grating used as a modulator in the present invention.
Figure 7:
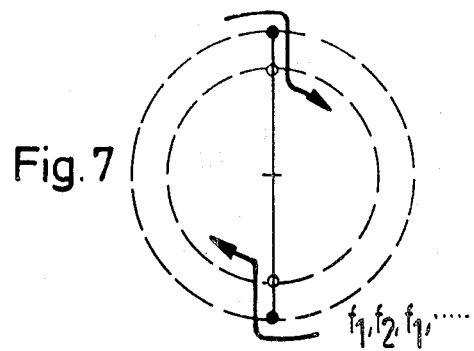
FIG. 7 is a Fourier spectrum for the grating of FIG. 6.

In FIG. 6, another type of diffraction grating composed of two semi-angular segments has the same orientation but different grating constant During the rotation of the grating, the Fourier transform of the first order of diffraction moves on one semicircle of one radius during half of the rotation of the grating, and then shifts to a concentric circle, as illustrated in FIG. 7.

Figure 8:
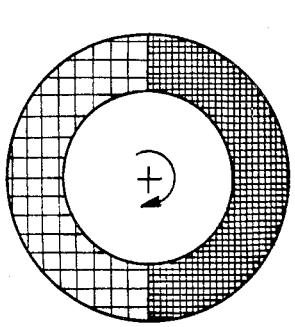
FIG. 8 is another example of a grating used as a modulator in the present invention.
Figure 9:
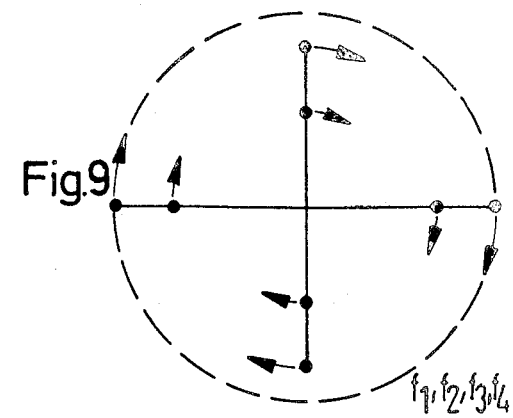
FIG. 9 is a Fourier spectrum belonging to the grating of FIG. 8.

In FIG. 8, the grating having two segments is similar to the grating in FIG. 6, but each segment has cross gratings of different grating constants and the spectrum in the Fourier plane provides several concentric circles (FIG. 9) during rotation.

Figure 10:
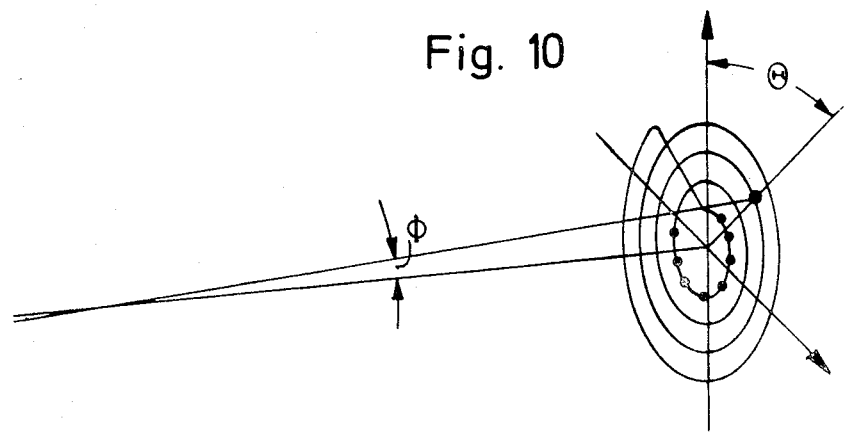
FIG. 10 illustrates a spiral path of a light beam on the focal plane of a Fourier lens according to the present invention.

Instead of one single grating, two rotating gratings are used in two different planes perpendicular to the beam path and are placed close to but ahead of the sign carriers. The sun amd difference of the diffraction angle of both gratings forms an angle phi for a particular frequency. If both gratings are rotated at the same constant angular speed, the angle phi remains constant for a given sign and the Fourier spectrum of the sign in the Fourier plane moves around in a circular path. The angle phi at the sum and difference of the separate diffraction angles of the two gratings can be varied if the gratings are rotated at different angular speeds. If the variation in the speed is continuous, the angle phi ($\phi$) will vary with the rotation of the gratings through the angle theta ($\theta$) producing a spiral path for the Fourier spectrum on the Fourier plane, as illustrated in FIG. 10. If the speed of rotation between the two gratings is changed with the orientation therebetween in a step-like manner, the Fourier spectrum on the Fourier plane can move on a plurality of concentric circles of different radii depending on the change in the angle phi.

Figure 11:
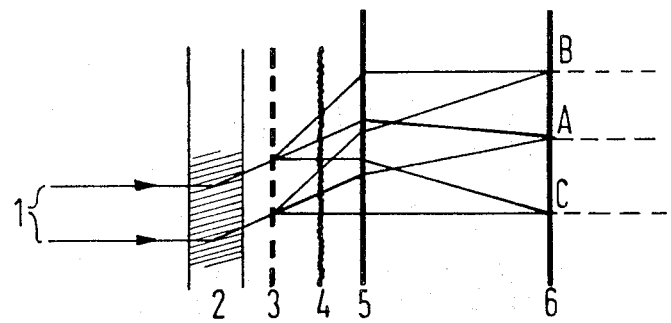
FIG. 11 is a schematic illustration of a beam path in the multichannel correlator with two rotatable gratings.
Figure 12:
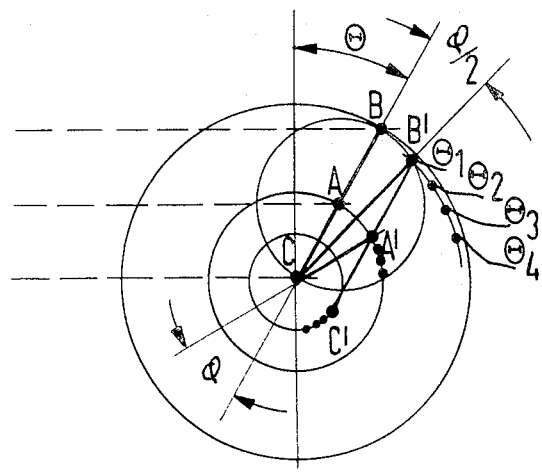
FIG. 12 is a Fourier transform for the arrangement of FIG. 11.

FIG. 11 schematically shows an embodiment of a coherent op-tical multichannel correlator with both phi and theta modulation. The grating 2 and a second grating 3 are positioned along with the sign carrier 4 along the axis of the beam of light 1. The gratings 2 and 3 can be rotated at different angular velocities which are continuously changing or are stepwise changing to provide phi modulation as well as theta modulation. As illustrated, the grating 2 is a volume-phase hologram which is positioned for the Bragg reflection of a single plane wave. The wave diffracted under the Bragg angle permeates the grating 3 which is a thin-phase hologram and then permeates the carrier 4 and is focused by the Fourier transformation lens 5 in the point A in the Fourier plane. The grating 3 creates a + 1 and − 1 diffraction order to the wave which is diffracted by grating 2. These diffracted waves are focused in the points B and C. If the gratings 2 and 3 are both turned with a constant angular speed, the points A, B, and C move on circles with the radii $r_A$, $r_B$, and $r_C$ around the origin of the local frequency spectrum in the Fourier plane as shown in FIG. 12. If the angle between the orientation of gratings 2 and 3 is not equal to zero, the corresponding spectral components are created at the points A, B, and C wherein the following applied: $r_A = r_A'$, but $r_B \neq r_B'$ and $r_C \neq r_C'$. In FIG. 12, the points A, B, and C are illustrated when both gratings are turned through an angle $\theta_1$, $\theta_2\theta_3$, and $\theta_4$.

Another embodiment of this structure for obtaining both phi and theta modulation utilizes a stationary modulating means which is an analogous magneto-optical light deflector instead of the two revolving diffraction gratings. In thin magnetic samples, whose preference directions do not lie parallel to the sample plane, small regularly occurring stripe domains are observed after application of a magnetic field, which domains lie parallel to the sample plane. The magnetizing components lie vertical to the plane of the sample and are reverse in sign from stripe to stripe.

Figure 13:
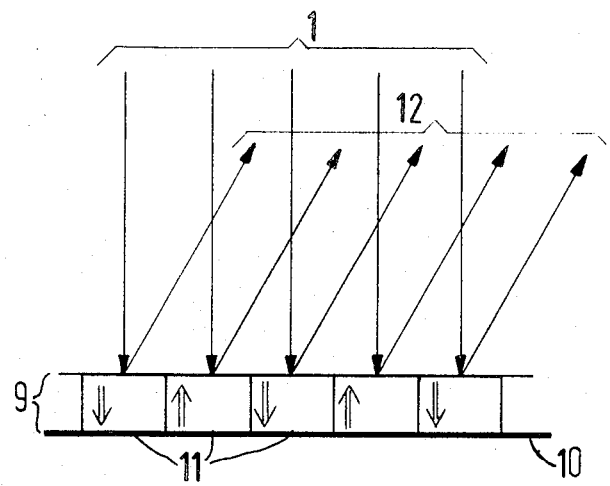
FIG. 13 diagrammatically illustrates a cross-section of a modulator for the present invention.

In FIG. 13, a magnetic layer of such material has stripe domains 11 with reversed signs for their magnetizing components from stripe to stripe, as indicated by the double arrows. A mirror 10 is provided on one side of the sample 9. If the thickness of the samples is chosen in such a way that the polarization plane of the light is turned by + or − 90° after permeating the sample twice, the partial waves, reflecting according to the reflection laws, extinguish each other by interference. The intensity of the reflection of the zero order is therefore very small. Where a light beam 1 hits the magnet layer 9, the individual stripe domains 11 with reverse magnetizing directions from stripe to stripe produces a first order deflection wave 12 (only one of the two illustrated) which is in the proper phase relation and wherein most of the entire reflected intensity is provided.

By changing the applied field strength, the width of the domains 11 and therefore the grating constant of these phase gratings can be changed continuously. A hysteresis can be avoided by the superimposed high frequency field. In the 25/$^\mu$m thick yttrium-iron garnet layer, a domain width of approximately 3/$^\mu$m was achieved by a field of 4 kA/m. A light deflector with a very large optical efficiency can be achieved whose diffraction angle can be continuously adjusted between 1° and 10°. By turning of the field, a two-dimensional light ray deflecting in one stage is made possible. By using micro strips for control, a circuit time or switching time of 1/$^\mu$sec can be achieved.

Figure 14:
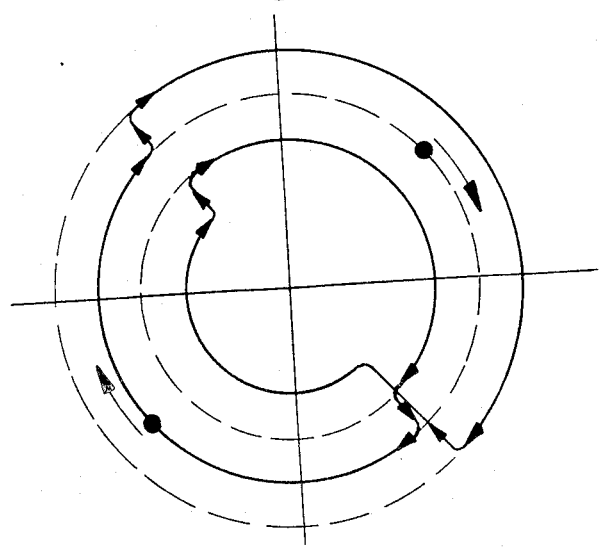
FIG. 14 illustrates a Fourier transform for the modulator of FIG. 13.

FIG. 14 diagrammatically illustrates the possible control positions of the individual frequency spectrum with sequential phy and theta modulation based on controllable magnetization domains. This shows that the storage capacity in a Fourier plane can be used to a maximum extent for a large number of individual adapted filters which are arranged in the path illustrated in FIG. 14.

Although various minor modifications might be suggested by those versed in the art, we wish to include in the patent warranted hereon, all such modifications as reasonably and properly come within the scope of our contribution to the art.

We claim:

1. A coherent optical multichannel correlator for identifying an object corresponding to one of a plurality of filter holograms comprising: means projecting a beam of coherent light for permeating an object to be identified, means for directionally modulating the beam of light by diffracting the beam to said one of said plurality of filter holograms, a Fourier transformation lens receiving the modulated light beam after permeating the object being identified, a plurality of filter holograms located on a focal plane of the lens, and photo detector means located in the focal plane of the filter holograms, said means for modulating serving to control the selection of the filter hologram used to identify the object.

2. A coherent optical multichannel correlator according to claim 1, wherein the photo detector means includes a plurality of individual photo detectors each having a threshold value with an individual photo detector arranged at the focal point of each of the filter holograms.

3. A coherent optical multichannel correlator according to claim 1, wherein the means for modulating comprises a rotatable diffraction grating.

4. A coherent optical multichannel correlator according to claim 1, wherein the means for modulating comprises a pair of rotatable diffraction gratings.

5. A coherent optical multichannel correlator according to claim 4, wherein the pair of diffraction gratings are gratings having ronchi gratings.

6. A coherent optical multichannel correlator according to claim 4, wherein the pair of rotatable diffraction gratings are thin phase holograms.

7. A coherent otpical multichannel correlator according to claim 4, wherein a pair of rotatable diffraction gratings include one grating being a volume-phase hologram and the other grating being a thin-phase hologram.

8. A coherent optical multchannel correlator according to claim 7, wherein the volume-phase hologram is arranged with the Bragg condition fulfilled at each angle by rotation of the grating.

9. A coherent optical multichannel correlator according to claim 4, which includes means for rotating the pair of gratings with the angle of orientation between the pair of gratings continually changing.

10. A coherent optical multichannel correlator according to claim 4, which includes means for rotating the pair of gratings with the angle of orientation between the gratings changing in a step-like manner.

11. A coherent optical multichannel correlator according to claim 1, wherein the means for modulating the beam of coherent light comprises a stationary grating mounted in the correlator, said grating having an orientation and grating constant dependent upon application of a magnetic field and means for applying a magnetic field to vary the grating constant and orientation of the grating.

12. A coherent optical multichannel correlator according to claim 11, wherein the grating consists of a magneto-optical material with stripe domains.

* * * * *